United States Patent
Nakashima et al.

(10) Patent No.: US 6,809,491 B2
(45) Date of Patent: Oct. 26, 2004

(54) POSITIONING CONTROL METHOD

(75) Inventors: Yasuhiro Nakashima, Tokyo (JP); Kiyofumi Funahashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/467,442

(22) PCT Filed: Jan. 21, 2002

(86) PCT No.: PCT/JP02/00387
§ 371 (c)(1),
(2), (4) Date: Aug. 9, 2003

(87) PCT Pub. No.: WO02/065224
PCT Pub. Date: Aug. 22, 2002

(65) Prior Publication Data
US 2004/0059495 A1 Mar. 25, 2004

(30) Foreign Application Priority Data
Feb. 9, 2001 (JP) .................... 2001-033817

(51) Int. Cl.[7] ........................... G05B 19/416
(52) U.S. Cl. .............. 318/568.18; 318/567; 318/568.1; 360/78.07; 369/44.28; 400/283; 355/53
(58) Field of Search .................. 318/568.18, 568.1; 360/78.07; 369/44.28; 400/283; 355/53

(56) References Cited

U.S. PATENT DOCUMENTS 3,952,238 A * 4/1976 Cutler .................. 318/571
5,911,125 A * 6/1999 Fujibayashi et al. ........ 702/141
5,936,792 A * 8/1999 Kobayashi et al. ....... 360/78.07
6,084,742 A * 7/2000 Takaishi et al. ......... 360/78.06
6,139,205 A * 10/2000 Suzuki et al. ................. 400/76
6,144,519 A * 11/2000 Hanaoka et al. ............. 360/92
6,215,740 B1 * 4/2001 Sasaki ..................... 369/44.28
6,331,885 B1 * 12/2001 Nishi .......................... 355/53

FOREIGN PATENT DOCUMENTS

| JP | 49-31013 A | 3/1974 |
|---|---|---|
| JP | 49-72813 A | 7/1974 |
| JP | 3-288914 A | 12/1991 |
| JP | 4-172506 A | 6/1992 |
| JP | 7-104859 A | 4/1995 |
| JP | 8-328635 A | 12/1996 |
| JP | 11-220364 A | 8/1999 |
| JP | 2000-69776 A | 3/2000 |

* cited by examiner

Primary Examiner—Rita Leykin
(74) Attorney, Agent, or Firm—Sughrue Mion, PLLC

(57) ABSTRACT

A position of an object is controlled based on a distance YS until the object is stopped, a target velocity VS of the object, acceleration time ta for accelerating the object, deceleration time td for decelerating the object, velocity variation ΔVa within the acceleration time, and velocity variation ΔVd within the deceleration time, and a deceleration-start distance YSd. The distance YSd is a distance from where the object is made to start deceleration. The distance YSd is a sum of an integer part YSdq and a decimal part YSdr of the deceleration-start distance. Thus, management of decimal fractions is performed with respect to a pulse generation unit that outputs an output pulse corresponding to the velocity instruction.

5 Claims, 4 Drawing Sheets

POSITIONING CONTROL METHOD

TECHNICAL FIELD

The present invention relates to a method of controlling, employed in stepping motors or servomotors, a position of an object.

BACKGROUND ART

As the first background art relating to the positioning control method, for example, a technique described in Japanese Patent Application Laid-Open No. 4-172506 can be mentioned. In this technique, when an object is to be shifted to a specified position, the object is accelerated up to a target velocity, shifted at the target velocity, then decelerated and stopped, to thereby perform positioning. The acceleration time at that time is set for each time frame (obtained by dividing a target distance by a target velocity).

With regard to this control method, an example in which the distance (instructed distance) of the object is 400 [pulses], and the target velocity is 50 per unit time [pulse/sec] is explained below.

The distance 400 [pulses] is divided by the target velocity 50 [pulses/sec], to thereby divide the distance into 8 unit time frames A to H, respectively having the distance of 50 [pulses].

Acceleration time is specified for the respective unit time frames. Here, when the same acceleration time (5 seconds) is assumed for all time frames, the distance 50 [pulses] in the unit time frame A is uniformly divided into the acceleration time 5 seconds, and reallocated to continuous five unit time frames A, B, C, D, and E by 10 [pulses], in order of the unit time frame A as a top.

Similarly, reallocation is sequentially performed, with the time frame to be reallocated shifted backwards by one, for the distance 50 [pulses] of the respective unit time frames (B to F, C to G, . . . ). When the reallocated time frame is not 5 unit time, a unit time frame having a distance 0 [pulse] is newly added, and reallocated.

When reallocation is finished, the reallocated distance is summed up for each unit time frame, to realize the initially specified shift.

As the second background art, a technique described in Japanese Patent Application Laid-Open No. 11-220364 can be mentioned. In this technique, the velocity control of the object is realized by generating an output pulse having an optional frequency proportional to an optional set value.

In this control method, at first, the number of times of acceleration within the acceleration time is determined according to the set rate of acceleration, and when the expected value agrees with the number of times the object is accelerated, the velocity is switched to a constant rate, and thereafter, decelerated with the same gradient as that of the acceleration.

As the third background art, there is a positioning control method, in which the distance of the object is allocated in an acceleration region, a constant rate (target velocity) region, and a deceleration region, and the velocity change is performed by comparing the current value (the distance that the object has been shifted) with the instructed distance for each control cycle.

In this control method, when acceleration is performed for each of predetermined control cycles, and the target velocity (or the distance in the acceleration region) is attained, constant-rate shift is performed at the target velocity. During this time, a comparison is made between the current value and the deceleration-start distance (obtained by subtracting the distance allocated to the deceleration region from the instructed distance) for each control cycle. When the current value reaches the deceleration-start distance, deceleration up to the target position is started, to thereby perform deceleration for each control cycle.

In the first and second background art, the deceleration time depends on the acceleration time, and only the deceleration time cannot be changed. Therefore, there is a problem in that it cannot deal with demands of performing positioning control of a machine slowly, with only the deceleration time extended, according to the desire of a user.

In the second background art, the distance is not taken into consideration, and since a method for determining the deceleration-start distance is not described, there is a problem in that accurate positioning cannot be performed.

In the third background art, calculation of distance with respect to the acceleration region, the target velocity region, and the deceleration region must be performed on a computing unit (or CPU) side that outputs the velocity instruction for each control cycle, and hence the load on the computing unit (or CPU) increases.

In the third background art, since a comparison of distance is made for each control cycle, it is quite unusual that the current value agrees with the deceleration-start distance at a break in the control cycle, and in most cases, the current value reaches the deceleration-start distance during the control cycle. Therefore, there is a problem in that optimization of the control cycle must be performed in order to start deceleration at an optimum timing.

In the third background art, when acceleration, constant rate and deceleration are to be switched, the current value (the velocity at which the object is moving) is compared with the target velocity, thereby causing a problem in that when the velocity value to be compared increases, the number of comparison circuits and gates also increases, and a large memory space is required for storing the distance allocated to the acceleration region, the constant rate region, and the deceleration region.

Therefore, it is an object of the present invention to provide a positioning control method capable of setting of the deceleration time independently of the acceleration time, and capable of performing accurate positioning.

It is another object of the present invention to provide a positioning control method for suppressing the load on the computing unit, and capable of reducing the number of circuits and gates, and memory space.

The positioning control method according to the present invention, in which an object is accelerated up to a target velocity VS, and then decelerated, to thereby perform position control of the object at a position shifted by a predetermined distance YS, by providing an output pulse of a frequency corresponding to an instructed velocity Vp to the object, includes a deceleration-start distance calculation step of executing processing for obtaining a deceleration-start distance YSd, being a distance until deceleration of the object is started, and being a sum of an integer part YSdq of the deceleration-start distance and a decimal part YSdr of the deceleration-start distance, separately for each of the integer part YSdq and the decimal part YSdr, with the integer part YSdq being in a unit of one pulse of the output pulse, and the decimal part YSdr being in a unit of $1/D1$ pulse, when it is assumed that a control frequency is denoted by fc, the minimum velocity of the output pulse is denoted by $1/n$, the number of seconds is denoted by n, and $D1=fc \times n$, before executing acceleration control of the object; and a deceleration-start point judgment step of judging a point in time when a value obtained by counting the output pulse becomes equal to or greater than the integer part YSdq obtained above, and the result of addition θ1 obtained by adding a velocity set value (VP×n) for each 1/fc time becomes equal to or greater than the value YSdR obtained by rounding off the decimal part YSdr to the nearest integer, as a deceleration start time, and starting deceleration from the judgment point.

At the deceleration-start distance calculation step, the deceleration-start distance YSd is calculated by subtracting a shifted distance Yd in the deceleration interval from the distance YS, and the shifted distance Yd in the deceleration interval is calculated by subtracting a distance decreased than that of the constant rate by deceleration, from the distance when the object is shifted by deceleration time td at the target velocity VS.

At the deceleration-start distance calculation step, when it is assumed that the object is decelerated by a velocity variation ΔVd for each time interval Δtd (=td/αd, αd; division number), during the deceleration time td, the deceleration-start distance YSd is calculated based on the calculation of the number of (ΔVd×Δtd), by using a computational expression of arithmetic series.

The integer part YSdq and the YSdR obtained by rounding off the decimal part YSdr to the nearest integer of the deceleration-start distance are determined by the following equations:

$$YSdq = \text{quotient of } (2 \times fc \times n \times YS - (2 \times VS \times n - \Delta Vd \times n \times (\alpha d + 1)) \times \Delta td \times \alpha d)/(2 \times fc \times n) \geq 0 \text{ [pulse]};$$

$$YSdR = \text{quotient of b (surplus of } (2 \times fc \times n \times YS - (2 \times VS \times n - \Delta Vd \times n \times (\alpha d + 1)) \times \Delta td \times \alpha d)/(2 \times fc \times n))/2 \geq 0 \; [(1/(fc \times 2)) \text{ pulse}],$$

where the minimum velocity of the output pulse is multiplied by n in order to display the minimum velocity of the output pulse in an integer, the minimum velocity is expressed by 1 [(1/n) pulse/sec], n denotes the number of seconds, and αd is a division number of deceleration time td into Δtd/fc [(1/fc) sec].

The positioning control method further comprises an acceleration and constant rate step of changing the frequency of the output pulse to thereby accelerate the velocity of the object until the velocity of the object reaches the target velocity VS, and thereafter driving the object at the target velocity VS, which is a step executed after the deceleration-start distance calculation step and before the deceleration start time judgment step.

BEST MODE FOR CARRYING OUT THE INVENTION

First Embodiment

Figure 1:
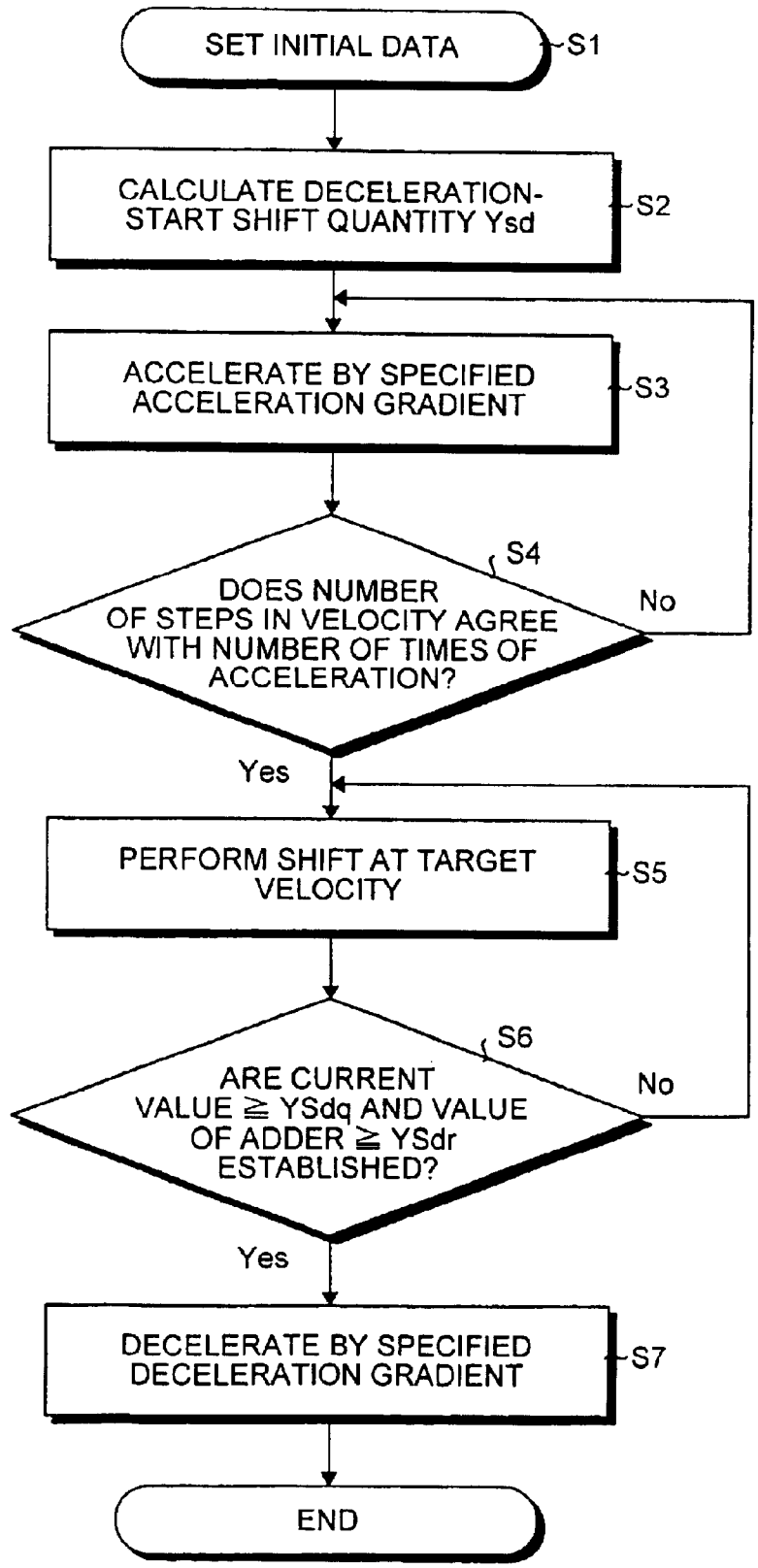
FIG. 1 is a flowchart of the positioning control method according to an exemplary embodiment of the present invention.
Figure 2:
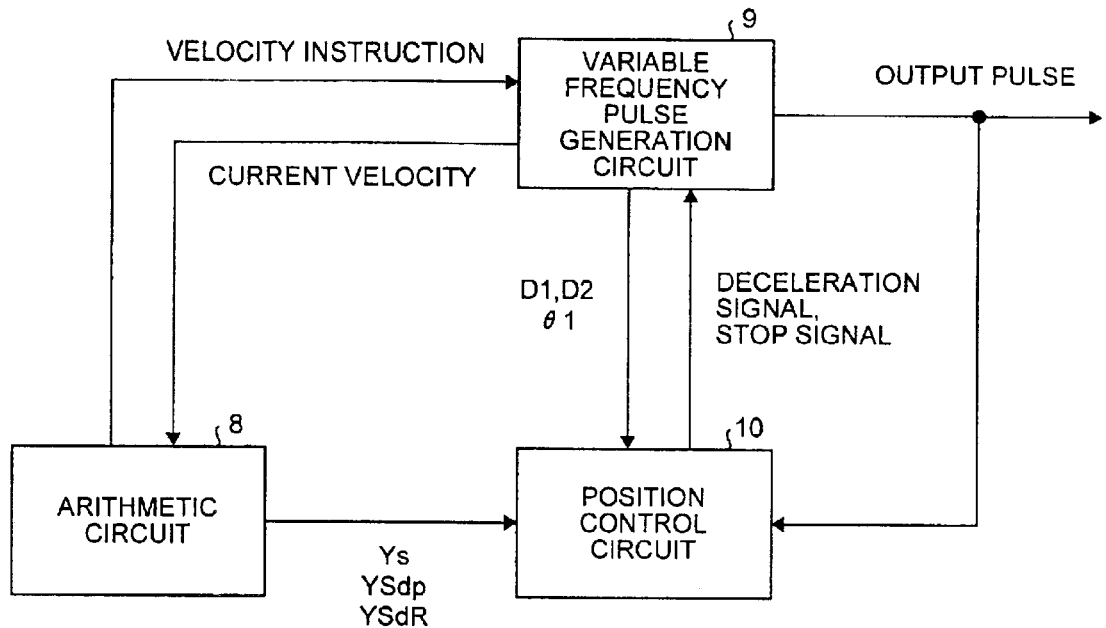
FIG. 2 is a block diagram of a positioning apparatus that employs the positioning control method according to the embodiment of the present invention.

FIG. 1 is a flowchart of the positioning control method according to a first embodiment of the present invention. FIG. 2 is a block diagram of a positioning apparatus that employs the positioning control method according to the first embodiment of the present invention.

Here, a pulse that does not come up to one pulse is defined as a pulse of decimal fraction, and in the pulse of the deceleration-start distance YSd, being a distance until starting deceleration, the pulse having a unit of one pulse is designated as an integer part YSdq of the deceleration-start distance YSd, and the pulse of decimal fraction is designated as a decimal part YSdr of the deceleration-start distance YSd. In other words, the decimal part is treated as integer by unit conversion. For example, when the control cycle is designated as 1/fc, the unit is set to 1/(fc×n) pulse.

One obtained by rounding off the decimal part YSdr of the deceleration-start distance YSd to the nearest integer is expressed as YSdR, so that the result of addition θ1 (integer) from a variable frequency pulse generation circuit 9 in FIG. 2 can be compared with the decimal part YSdr (decimal fraction) of the deceleration-start distance YSd.

In FIG. 2, reference numeral 8 denotes an arithmetic circuit having a computing unit or a CPU that performs calculation of the deceleration-start distance YSd for controlling the velocity of the object and provides a velocity instruction of the object to the variable frequency pulse generation circuit 9. Reference numeral 9 denotes the variable frequency pulse generation circuit that outputs pulses based on the velocity instruction from the arithmetic circuit 8.

Reference numeral 10 denotes a position control circuit having: a unit that compares the YSdq that determines the integer part of the deceleration-start distance YSd and a value obtained by counting the output pulse of the variable frequency pulse generation circuit 9; a unit that compares the YSdR obtained by rounding off the YSdr to the nearest integer that determines the decimal part of the deceleration-start distance YSd and the result of addition θ1 from the variable frequency pulse generation circuit 9; a unit that provides a deceleration signal for controlling the velocity of the object to the variable frequency pulse generation circuit 9, based on these comparison results; and a unit that provides a stop signal for stopping the output pulse of the variable frequency pulse generation circuit 9, to the variable frequency pulse generation circuit 9, when the value obtained by counting the output pulse of the variable frequency pulse generation circuit 9 agrees with the distance YS until the object is stopped.

How the variable frequency pulse generation circuit 9 generates the pulses (hereinafter, "pulse generation method") is explained below.

Figure 3:
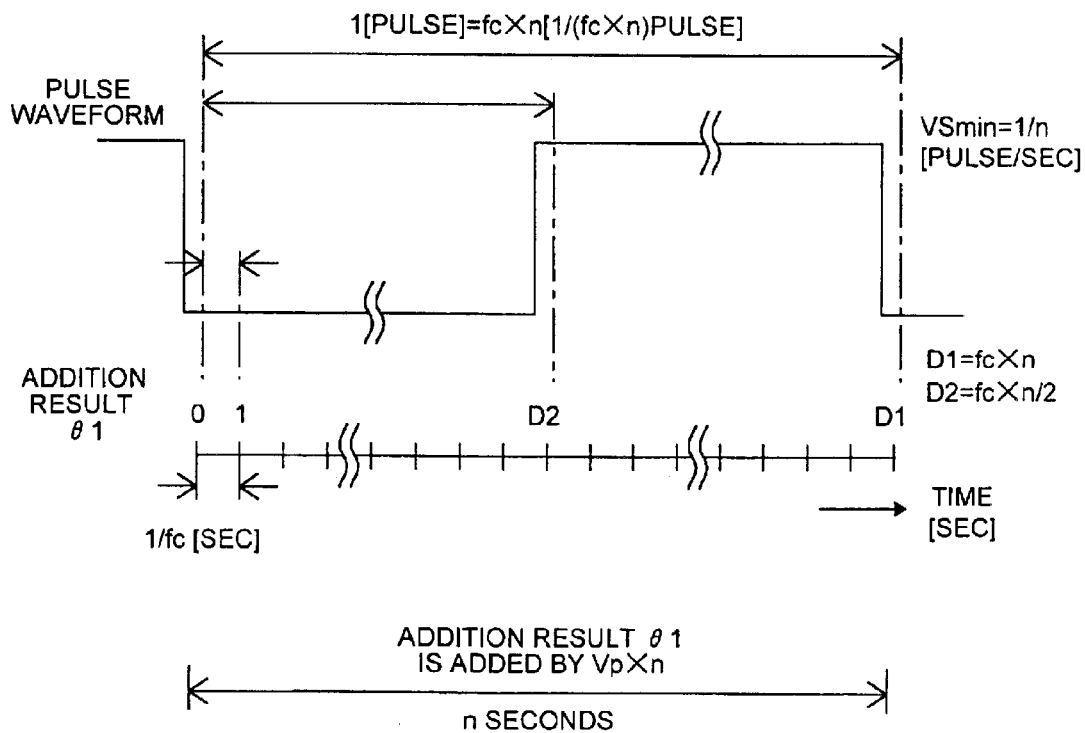
FIG. 3 shows the relationship between the output waveform of a pulse generator and an result of addition θ1.

FIG. 3 shows the relationship between the output waveform of the variable frequency pulse generation circuit 9 and the result of addition θ1. The variable frequency pulse generation circuit 9 comprises an adder, a comparator, a subtracter (or an arithmetic program) and the like, and determines a value of the output pulse (0 or 1) by a comparison between the result of addition θ1 of the adder and two reference values D1 and D2 as shown in FIG. 3, to generate a pulse.

The adder adds a velocity set value Vp×n to an initial value of the adder (it is not always 0) for each 1/fc (fc: control frequency Hz) time, and the result of addition is designated as θ1. By repeating this for each 1/fc time, to compare the result of addition θ1 and the two reference values D1 and D2 by the comparator. When the result of addition θ1 becomes D2=(fc×n)/2 (n: optional number), the logical value of the output pulse becomes 1, and when D1 becomes fc×n, the logical value of the output pulse becomes 0, to thereby generate the output pulse.

When the result of addition θ1 reaches D1, the subtracter subtracts D1 from the result of addition θ1, in order to prevent overflow of the adder. By repeating this, pulses are generated and output. Therefore, by changing the value of the velocity set value Vp×n set in the adder, the velocity (frequency of the pulse) can be changed.

The operation of the positioning control apparatus will be explained now while referring to the flowchart in FIG. 1.

Figure 4:
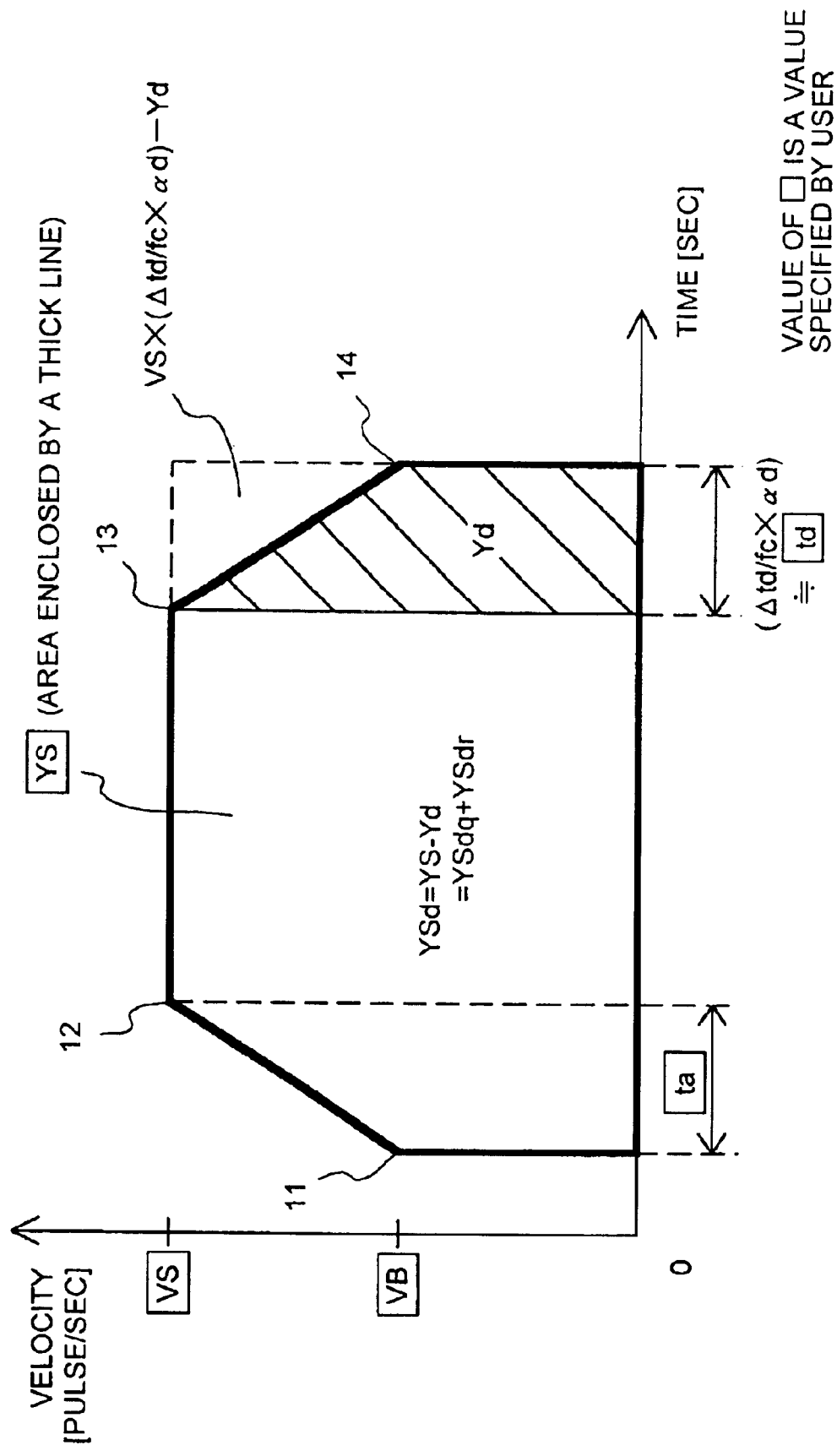
FIG. 4 shows the relationship between the velocity of an object and time.

At step S1, the distance YS until the object is stopped (the area enclosed by a thick line) as shown by 14 in FIG. 4, target velocity VS of the object, bias velocity (obtained by raising the bottom line of the constant velocity such as initial velocity and terminal velocity) VB of the object, acceleration time ta for accelerating the object, deceleration time td for decelerating the object, velocity variation ΔVa in the acceleration time (velocity to be changed for each time interval Δta), and velocity variation ΔVd in the deceleration time (velocity to be changed for each time interval Δtd) are set in a register in the arithmetic circuit 8 in FIG. 2, using a S/W (Soft Wear).

The velocity variation ΔVa in the acceleration time and the velocity variation ΔVd in the deceleration time are optional values, and are given by using an arithmetic program or the like, so that the object smoothly accelerates or decelerates. Further, VB may be 0, and when the initial velocity and the terminal velocity are different, the terminal velocity value needs only be put in the bias velocity VB.

At step S2, the arithmetic circuit 8 calculates the deceleration-start distance YSd based on the data specified at step S1.

How the deceleration-start distance YSd is calculated (hereinafter, "the calculation method") will now be explained while referring to FIG. 4 and FIG. 5.

FIG. 4 shows the relationship between the velocity of the object and time, and a product of velocity and time becomes the distance of movement of the object. The acceleration and deceleration gradients shown in FIG. 4 are actually stepwise as shown in FIG. 5. In FIG. 5, αd denotes a division number of the deceleration time, A denotes a division number of a velocity difference |VS−VB| (the number of steps in the velocity). The number of steps A in the velocity is, as shown in FIG. 5, the number of times when the object is decelerated by the velocity variation ΔVd in the deceleration time for each time interval Δtd, until current velocity of the object is decelerated to the bias velocity VB. Therefore, the object is decelerated once, at the time of reaching the deceleration-start distance, and thereafter, decelerated αd times for each time Δtd. As a result, the number of steps A in the velocity keeps the relationship of A=αd+1.

Figure 5:
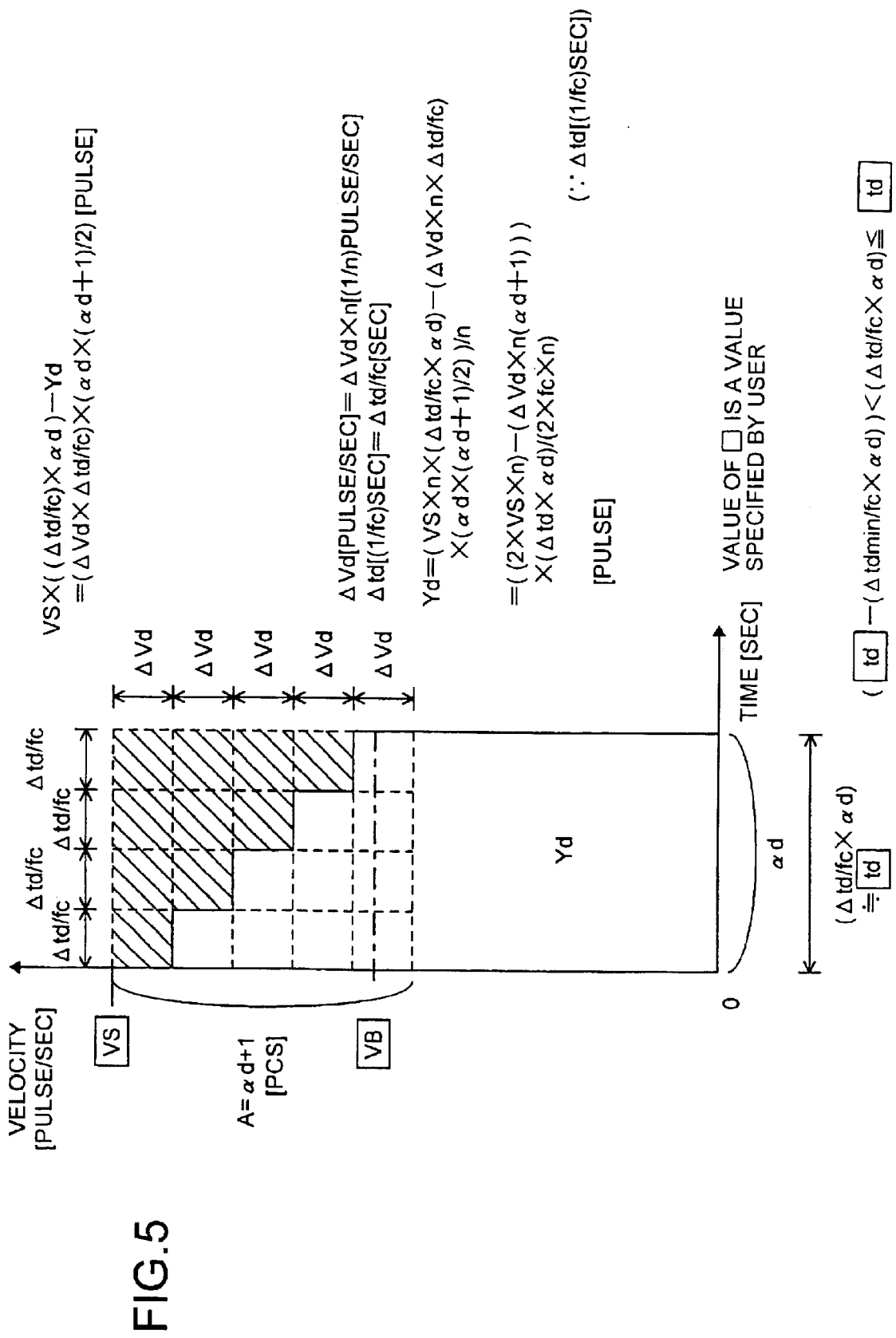
FIG. 5 shows the details of deceleration portion in FIG. 4.

The control and calculation method of the deceleration-start distance uses a computational expression of arithmetic series (also referred to as arithmetic progression) (this is used when calculating the distance of the oblique line portions in FIG. 5). Here, the acceleration and deceleration gradients are set such that tolerance=1, and the first term=1. Particularly, the case of tolerance=1 and the first term=1 is also referred to as Pythagorean triangular numbers.

Since the integer part of the deceleration-start distance YSd is YSdq, and the decimal part of the deceleration-start distance YSd is YSdr, the deceleration-start distance YSd can be expressed as YSd=YSdq+YSdr.

In other words, when it is assumed that the deceleration-start distance YSd is 100.5 pulses, the integer part of the deceleration-start distance YSd is 100 pulses, and the decimal part of the deceleration-start distance YSd is 0.5 pulse.

Since the decimal part YSdr of the deceleration-start distance YSd is 0.5 pulse, the YSdR obtained by rounding off the decimal part YSdr of the deceleration-start distance YSd becomes D2 from FIG. 3.

Since the integer part YSdq of the deceleration-start distance YSd does not exceed the distance YS until the object is stopped, 0≦YSdq≦YS is established, and YSdR obtained by rounding off the decimal part YSdr of the deceleration-start distance YSd becomes 0≦YSdR≦(D1−1), since D1 is subtracted from the result of addition θ1, when the result of addition becomes θ1≧D1.

The integer part YSdq of the deceleration-start distance YSd is in a unit of one pulse, and the result of addition θ1 increases by Vp/D1 pulse. Therefore, YSdR obtained by rounding off the decimal part YSdr of the deceleration-start distance YSd is set to a unit of 1/D1 pulse, by taking the minimum unit.

Since the deceleration-start distance is a distance until the object starts to decelerate, when the current value of the object reaches the deceleration-start distance, deceleration is started.

In other words, the object starts to decelerate, when the current value (the integer part of the number of output pulse) reaches the deceleration-start distance YSdq in a unit of one pulse (integer part), and the result of addition θ1 (the decimal part of the number of output pulse) becomes equal to or greater than the YSdR obtained by rounding off the decimal part YSdr of the deceleration-start distance YSd in a unit of 1/D1 pulse (decimal part).

The deceleration-start distance YSd can be calculated by subtracting the deceleration part Yd from the distance YS until the object is stopped, as shown in FIG. 4.

The deceleration part Yd is obtained by removing the area of the oblique line portion, that is, a distance is removed from a distance if the deceleration was constant, from the area (distance) when the object is shifted by the deceleration time (Δtd/fc[sec]×αd[pcs])≈td (sec) at a velocity VS in FIG. 5 . . . (1)

Since the number of (ΔVd×Δtd/fc) in the oblique line portion is in the arithmetic series of tolerance=1 and the first term=1, such as 1, 2, 3, 4 from the left, (4×(4+1))/2=10 [pcs] is established from the formula.

Therefore, when generalized, the area of the oblique line portion becomes:

$$(\Delta Vd \times \Delta td/fc) \times (\alpha d \times (\alpha d+1))/2 [\text{pulse}] \quad (2)$$

In this method, the number of groups of pulse, (ΔVd×Δtd/fc), is calculated by using the arithmetic series.

Generally, the formula of the arithmetic series cannot be used for the calculation of a value including a decimal fraction. However, since it is when the number of groups of pulse, (ΔVd×Δtd/fc), is calculated that the formula of the arithmetic series is used, even when the value of (ΔVd×Δtd/fc) includes a value of decimal fraction, the arithmetic series can be used. As a result, the number of pulse in the decimal fraction can be taken into consideration.

From the above, a computational expression for the deceleration-start distance YSd is shown.

It is assumed such that fc=control frequency [Hz], VS=target velocity [pulse/sec], Δtd/fc=time [sec] for changing the velocity, αd=division number of time, or (division number of velocity—1) [pcs].

The velocity variation ΔVd [pulse/sec] in the deceleration time is obtained by dividing the velocity difference |VS−VB| by ($\alpha d+1$). Hence, the result may include a decimal fraction, according to the value of ($\alpha d+1$). Therefore, the velocity variation $\Delta Vd$ is expressed by using the minimum velocity, so that a value of decimal fraction does not appear in the computational expression for the deceleration-start distance.

Since the variable frequency pulse generation circuit 9 generates $1/D1=1/(fc \times n)$ pulse in $1/fc$ second, the minimum velocity becomes $D1/fc=1/n[pulse/sec]=1[[(1/n)$ pulse/sec].

Since the velocity variation $\Delta Vd$ [pulse/sec] can be expressed as $\Delta Vd[pulse/sec]=\Delta Vd \times n[(1/n)$ pulse/sec], from the minimum velocity $D1/fc=1/n[pulse/sec]=1[(1/n)$ pulse/sec].

$\alpha d$ is calculated as follows from $A=\alpha d+1=(VS-VB)/\Delta Vd$:

$\alpha d$=(rounding up of the decimal part of $(VS-VB) \times n/\Delta Vd \times n)-1$ [pcs].

When $\Delta Vd=0$, there is no velocity change in the deceleration time, and this means that the object does not decelerate. That is, since there is no deceleration time, $\alpha d=0$.

In the computational expression, when 0 is substituted in $\Delta Vd$, being the denominator, the numerator is divided by 0, and hence $\alpha d$ becomes infinity. Therefore, when $\Delta Vd=0$, $\alpha d$ is made to 0.

$\Delta td$ is calculated in the following manner, from $td=\alpha d \times \Delta td/fc$.

Since the variable frequency pulse generation circuit 9 generates the output pulse for each $1/fc$ time, when $td$ [sec] is unit-converted to $td \times fc$ [in unit of $1/fc$ sec], $\Delta td$=(quotient of $(td \times fc)/\alpha d)$ [in unit of $1/fc$ sec].

When $\alpha d=0$, since there is no deceleration time, $\Delta td=0$.

Since the surplus of $((td \times fc)/\alpha d)$ is rounded off, the value of $\Delta td$ obtained from the computational expression does not always satisfy $\Delta td/fc \times \alpha d=td$, and the value of $\Delta td/fc \times \alpha d$ takes a value in the vicinity of the deceleration time $td$, and the following expression is established:

$(td$-minimum value of $\Delta td \times \alpha d) < (\Delta td/fc \times \alpha d) \leq td$.

In order to decrease an error, the minimum value of $\Delta td$ needs only to be decreased, and this means to decrease $1/fc$, and increase $fc$.

Therefore, the distance $Yd$ of the deceleration portion is calculated in the following manner, from the expressions (1) and (2):

$Yd$ = (area when the object is shifted by the time $(\Delta td/fc \times \alpha d)$ at the velocity $VS$) −

(area of the oblique line portion in FIG. 5)

$= (VS \times (\Delta td/fc \times \alpha d)) - (\Delta Vd \times n \times \Delta td/fc) \times$ $(\alpha d \times (\alpha d + 1))/2)/n$ [pulse].

When it is assumed that $\Delta Vd \times n$ [(1/n) pulse/sec], and $\Delta td/fc$ [sec] is rounded off based on $1/fc$ [sec], it is expressed as $\Delta td$ [1/fc sec].

When this expression is sorted out, $Yd = (VS \times (\Delta td/fc) \times \alpha d) - (\Delta Vd \times n \times \Delta td/fc) \times$ $(\alpha d \times (\alpha d + 1))/2)/n$ $= ((2 \times VS \times n \times \Delta td \times \alpha d) - (\Delta Vd \times n \times \Delta td \times \alpha d \times (\alpha d + 1))/$ $(2 \times fc \times n)$ $= ((2 \times VS \times n) - (\Delta V \times n \times (\alpha d + 1)) \times (\Delta td \times \alpha d)/$ $(2 \times fc \times n)$ [pulse]

$(\therefore \Delta td$ is [in a unit of $1/fc$ sec])

Therefore, the deceleration-start distance $YSdq$ in a unit of one pulse (integer part) is calculated as follows:

$YSdq$ = integer part of $(YS - Yd)$ [in a unit of one pulse]

= quotient of $(2 \times fc \times n \times YS - (2 \times VS \times n -$ $\Delta Vd \times n \times (\alpha d + 1)) \times \Delta td \times \alpha d)/(2 \times fc \times n) \geq 0$ [pulse].

In the case of the calculation result of $YSdq<0$, since $YSdq$ is the deceleration-start distance of the object, it does not become negative, and hence $YSdq=0$.

When $YS=0$, then $YSdq \geq 0$.

A computational expression for $YSdR$ obtained by rounding off the deceleration-start distance $YSdr$ in a unit of $1/D1$ pulse (decimal part) is shown below. Here, the result of addition $\theta 1$ is an integer, it is necessary to round off the decimal part of $(YS-Yd)$ to the nearest integer.

Therefore, the decimal part $YSdr$ of $(YS-Yd)$ is multiplied by $(2 \times fc \times n)$, to determine the surplus of $(2 \times fc \times n \times YS - (2 \times VS \times n - \Delta Vd \times n \times (\alpha d+1)) \times \Delta td \times \alpha d)/(2 \times fc \times n)$.

However, the deceleration-start distance $YSdr$ is in a unit of $1/D1$ pulse, and $D1=(fc \times n)$, and hence in order to make it in a unit of $1/(fc \times n)$ pulse, the surplus of $(2 \times fc \times n \times YS - (2 \times VS \times n - \Delta Vd \times n \times (\alpha d+1)) \times \Delta td \times \alpha d)/(2 \times fc \times n)$ is divided by 2.

Therefore, $YSdR$ = (decimal part $YSdr$ of $(YS - Yd)) \times (2 \times fc \times n)/2$ = quotient of (surplus of $(2 \times fc \times n \times YS -$ $(2 \times VS \times n - \Delta Vd \times n \times (\alpha d + 1)) \times \Delta td \times \alpha d)/$ $(2 \times fc \times n)/2 \geq 0$ [(1/(fc \times 2)) pulse].

In the case of the calculation result of $YSdr<0$, since $YSdr$ is the deceleration-start distance of the object, it does not become negative, and hence $YSdR=0$.

When $YS=0$, then $YSdR \geq 0$.

By using the above expression, before the velocity instruction is issued to the variable frequency pulse generation circuit 9, the deceleration-start distance $YSd$ (=$YSdq+YSdr$) can be calculated, and hence it is not necessary to calculate the distance $YS$ with respect to the acceleration region, the target velocity region, and the deceleration region, every time the arithmetic circuit 8 issues a velocity instruction.

The arithmetic circuit 8 in FIG. 2 gives a velocity instruction to the variable frequency pulse generation circuit 9, after calculation of the deceleration-start distance $YSd$ (=$YSdq+YSdr$).

The variable frequency pulse generation circuit 9 having received the velocity instruction generates a pulse by comparing the result of addition $\theta 1$ of the adder with the two reference values $D1$ and $D2$, and outputs the pulse.

At this time, the position control circuit 10 counts the output pulse of the variable frequency pulse generation circuit 9, and the count result becomes the current value (the integer part of the output pulse) of the object.

Thereafter, at step S3, the variable frequency pulse generation circuit 9 occasionally changes the frequency of the output pulse for each time interval Δta determined by the arithmetic circuit 8, to occasionally accelerate the velocity of the object from the initial velocity.

At step S4, the arithmetic circuit 8 compares the number of times of acceleration until the velocity of the object reaches the target velocity (the number of steps in the velocity A=αd+1) with the number of times the object is actually accelerated, that is, the number of velocity instructions given to the variable frequency pulse generation circuit 9, in order to judge whether the velocity of the object reaches the target velocity. When the comparison result agrees, control proceeds to step S5.

At step S5, the arithmetic circuit 8 issues a velocity instruction to the variable frequency pulse generation circuit 9, to change the current velocity to the target velocity.

At step S6, the position control circuit 10 occasionally compares the current value (number of output pulse) with the integer part YSdq of the deceleration-start distance, and θ1, being the result of the adder (number of output pulse of decimal fraction) with YSdR obtained by rounding off the decimal part YSdr of the deceleration-start distance, in order to judge the deceleration-start distance of the object. When the current value reaches the deceleration-start distance (current value≧YSdq, and θ1≧YSdR), control proceeds to step S7.

At step S7, the positioning control circuit 10 gives a deceleration signal to the variable frequency pulse generation circuit 9, to start deceleration.

The variable frequency pulse generation circuit 9 occasionally decelerates from the target velocity for each determined time interval Δtd (which does not depend on the acceleration time), according to the deceleration gradient instructed from the arithmetic circuit 8, and after having decelerated for αd times, keeps the velocity.

The positioning control circuit 10 occasionally compares the current value with the distance YS until the object is stopped, and as shown by 14 in FIG. 4, when the current value reaches the distance YS until the object is stopped, gives a stop signal to the variable frequency pulse generation circuit 9. The variable frequency pulse generation circuit 9 stops pulse output.

In the first embodiment, an example of using a variable frequency pulse generation circuit has been explained, but needless to say, a fixed frequency pulse generation circuit can be used. The current velocity may be compared with the target velocity, instead of comparing the number of steps in the velocity with the number of acceleration.

An example of arithmetic series of tolerance=1 and the first term=1 has been explained, but in other examples, the deceleration-start distance YSd can be calculated by using the series. These positioning control apparatus can obtain the similar functions by using an arithmetic program.

According to the first embodiment, since YSd is obtained without using a value of acceleration time, when calculating the deceleration-start distance, deceleration time and velocity variation (deceleration gradient) can be set independently of the acceleration time, even when the initial velocity and the terminal velocity are different.

Since the deceleration-start distance is not judged by a break in the fixed control cycle (several ms), but controlled by the number of pulse of decimal fraction, deceleration can be started at an optimum timing fc (several tens ns).

Since the deceleration-start distance can be calculated by one computational expression using the formula of series, calculation of distance with respect to the acceleration region, the target velocity region, and the deceleration region is not required. Thereby, the load on the arithmetic circuit can be suppressed, enabling position control of many objects to be controlled with less arithmetic circuit.

When switching of the acceleration region, the target velocity region, and the deceleration region is performed, since a comparison is made between the number of steps in the velocity and the number of times of acceleration of the object, the number of circuit s and gates can be reduced, as compared with the case when the current velocity and the target velocity are compared. When a complicated control is required, such as when the velocity is changed during acceleration or deceleration, a comparison of velocity is only necessary.

Since only the distance of the calculated deceleration-start distance has to be stored, a memory space for storing the distance allocated in the acceleration region, the target velocity region, and the deceleration region is not required.

Since only a simple control such as a comparison and calculation is performed, with respect to from the pulse control to the switching method of velocity, the control can be easily realized by an arithmetic program.

Even when the number of pulse of decimal fraction is included in the deceleration-start distance, the deceleration-start distance can be calculated by performing calculation of the number of (ΔVd×Δtd/fc), using the formula of series, by designating a group of real number of pulse of (ΔVd×Δtd/fc).

Since the present invention is constructed as explained above, effects described below can be exhibited.

The deceleration-start distance YSd is obtained as a sum of an integer part YSdq of the deceleration-start distance and a decimal part YSdr of the deceleration-start distance, to manage the decimal fraction with respect to the pulse generation unit that outputs the output pulse corresponding to the velocity instruction. Therefore, at the time of calculation of the deceleration-start distance, the deceleration time and the velocity variation (deceleration gradient) can be set independently of the acceleration time set by a user, without using the value of the acceleration time, enabling correspondence even when the initial velocity and the terminal velocity are different. As a result, accurate positioning becomes possible by managing the deceleration-start distance by the number of pulse of decimal fraction.

Since the deceleration-start distance can be calculated by a computational expression using the formula of series, calculation of a distance with respect to the acceleration region, the target velocity region, and the deceleration region is not required, thereby reducing the load on the arithmetic circuit.

Industrial Applicability

As described above, the positioning control method according to the present invention is suitable for controlling the position of an object, such as a stepping motor and a servomotor.

What is claimed is:

1. A positioning control method in which an object is accelerated up to a target velocity VS, and then decelerated, to thereby perform position control of the object at a position that is a predetermined distance YS away from an original position of the object, by providing an output pulse of a frequency corresponding to an instructed velocity Vp to the object, comprising:

a deceleration-start distance calculation step of executing processing for obtaining a deceleration-start distance YSd, being a distance until deceleration of the object is started, and being a sum of an integer part YSdq of the deceleration-start distance and a decimal part YSdr of the deceleration-start distance, separately for each of the integer part YSdq and the decimal part YSdr, with the integer part YSdq being in a unit of one pulse of the output pulse, and the decimal part YSdr being in a unit of 1/D1 pulse, when a control frequency is denoted by fc, the minimum velocity of the output pulse is denoted by 1/n, the number of seconds is denoted by n, and D1=fc×n, before executing acceleration control of the object; and a deceleration-start point judgment step of judging a point in time when a value obtained by counting the output pulse becomes equal to or greater than the integer part YSdq, and the result of addition θ1 obtained by adding a velocity set value (VP×n) for each 1/fc time becomes equal to or greater than the value YSdR obtained by rounding off the decimal part YSdr to the nearest integer, after the object is acceleration-controlled, as a deceleration start time, and controlling the object to start deceleration from the point in time judged.

2. The positioning control method according to claim 1, wherein at the deceleration-start distance calculation step, the deceleration-start distance YSd is calculated by subtracting a distance Yd for which the object moved during the deceleration interval from the distance YS, wherein the distance Yd is calculated by subtracting a distance equivalent to a distance that is less due to the deceleration as compared to when the object is moving at a constant rate, from the distance when the object is shifted for a deceleration time td at the target velocity VS.

3. The positioning control method according to claim 2, wherein at the deceleration-start distance calculation step, when the object is decelerated by a velocity variation $\Delta Vd$ for each time interval $\Delta td$ (=td/$\alpha d$, where $\alpha d$ is division number), during the deceleration time td, the deceleration-start distance YSd is calculated based on the calculation of the number of ($\Delta Vd \times \Delta td$), by using a computational expression of arithmetic series.

4. The positioning control method according to claim 3, wherein when $\Delta td[(1/fc) \sec] = \Delta td/fc$ [sec], the integer part YSdq [pulse] and the YSdR [(1/(fc×n)) pulse] obtained by rounding off the decimal part YSdr [pulse] to the nearest integer of the deceleration-start distance are determined by the following expressions:

$$YSdq = \text{quotient of } (2 \times fc \times n \times YS - (2 \times VS \times n - \Delta Vd \times n \times (\alpha d + 1)) \times \Delta td \times \alpha d)/(2 \times fc \times n) \geq 0 \text{ [pulse], and}$$

$$YSdR = \text{quotient of (surplus of } (2 \times fc \times n \times YS - (2 \times VS \times n - \Delta Vd \times n \times (\alpha d + 1)) \times \Delta td \times \alpha d)/(2 \times fc \times n))/2 \geq 0 \text{ [(1/(fc \times 2)) pulse]}.$$

5. The positioning control method according to claim 1, further comprising an acceleration and constant rate step of changing the frequency of the output pulse to thereby accelerate the velocity of the object until the velocity of the object reaches the target velocity VS, and thereafter driving the object at the target velocity VS, which is a step executed after the deceleration-start distance calculation step and before the deceleration start time judgment step.

* * * * *